H. B. DIPWORTH.
MITER MACHINE ATTACHMENT.
APPLICATION FILED MAY 26, 1916.

1,220,964.  Patented Mar. 27, 1917.

Witnesses
L. R. Heinrichs
J. J. McCarthy

Inventor
H. B. Dipworth
By Victor J. Evans
Attorney

UNITED STATES PATENT OFFICE.

HERMANN BRUNO DIPWORTH, OF SAGINAW, MICHIGAN.

MITER-MACHINE ATTACHMENT.

1,220,964.   Specification of Letters Patent.   Patented Mar. 27, 1917.

Application filed May 26, 1916. Serial No. 100,101.

*To all whom it may concern:*

Be it known that I, HERMANN B. DIPWORTH, a citizen of the United States, residing at Saginaw, in the county of Saginaw and State of Michigan, have invented new and useful Improvements in Miter-Machine Attachments, of which the following is a specification.

This invention relates to an attachment for mitering machines and has particular application to an attachment for mitering machines that are used to cut molding such as picture frame molding, wall molding and the like.

As is well known, the molding clamps or holders in mitering machines are arranged at such an angle to the saw guides as to miter the ends of the molding at a forty-five degree angle in the operation of the machine. Therefore, in carrying out the present invention, it is my purpose to provide an attachment for mitering machines of the class described whereby the ends of the molding may be cut at an angle of ninety degrees so as to produce a square cut for block corner frames, butt joint frames and partitions or dividers in frames.

With the above and other objects in view, the invention consists in the construction, combination and arrangement of parts hereinafter set forth in and falling within the scope of the claim.

In the accompanying drawing.

Figure 1:
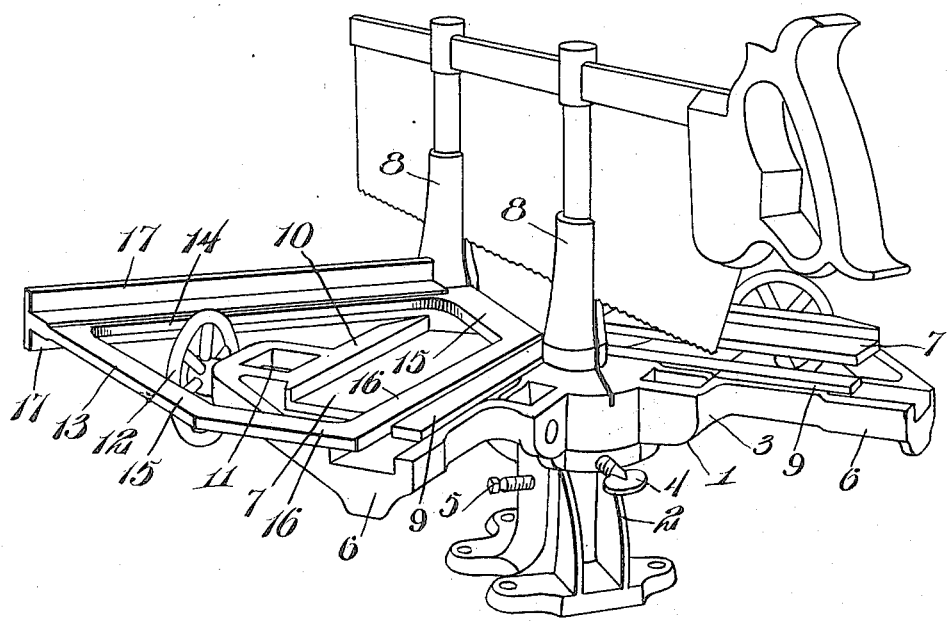
Figure 1 is a perspective view of a well known form of mitering machine equipped with an attachment constructed in accordance with the present invention.
Figure 2:
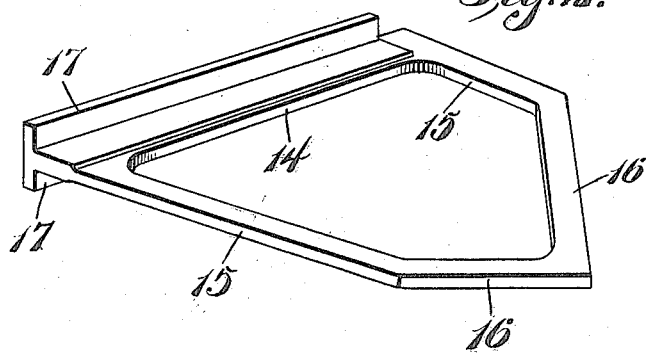
Fig. 2 is a similar view of the attachment removed from the machine.

Referring now to the drawing in detail, 1 designates what is known to the trade, as the March mitering machine, such machine embodying a pedestal 2 and a casting 3 mounted upon the upper end of the pedestal 2 and capable of rotary movement around the pedestal and of swinging movement on the pedestal so that the casting may be adjusted to any desired or convenient position, set screws 4 and 5 being employed to hold the casting in adjusted position against rotary and swinging movements respectively. This casting 3 is formed with outwardly projecting wings 6 that carry the molding clamps 7 respectively and arranged between the wings 6 are saw guides 8 disposed at such an angle relatively to the inner ends of the wings as to hold the saw mounted in the guides 8 at a forty-five degree angle to the molding in the clamps. Each molding clamp embodies a stationary jaw 9 fixed to the upper surface of the particular wing and a movable jaw 10 connected to a screw shaft 11 provided with a hand wheel 12 whereby the screw shaft may be rotated to move the jaw 10 toward and away from the stationary jaw 9 so as to grip and release the molding.

13 designates my improved attachment which, in the present instance, embodies a frame composed of an end bar 14, side bars 15, 15 projecting outwardly from the end bar 14 at right angles thereto and legs 16 integral with the outer ends of the bars 15 respectively and projecting outwardly from the bars 15 and converging toward each other and having the outer ends thereof integral with each other. The bar 14 is relatively wide as compared with the bars 15 and the legs 16 and has the outer edge thereof formed with laterally projecting flanges 17 arranged at right angles to the bar 14.

In practice, one leg 16 is secured in one of the clamps and owing to the shape of the frame the bar 14 is arranged at right angles to the plane of the saw guides. The molding is now placed upon the bar 14 and held against the upwardly projecting flange 17 and in the operation of the saw the end of the molding within the influence of the saw will be cut at an angle of ninety degrees, that is, at a right angle. By reversing the frame, the other leg may be secured in the other clamp and the other end of the molding cut at an angle of ninety degrees by the saw.

While I have herein shown and described the preferred form of my invention by way of illustration, I wish it to be understood that I do not limit or confine myself to the precise details of construction herein described and delineated, as modification and variation may be made within the scope of the claim and without departing from the spirit of the invention.

I claim:

An attachment for miter machines of the class described, comprising a frame formed of an end bar, side bars projecting outwardly from the end bar at right angles thereto, and legs integral with the outer ends of said side bars, respectively, and projecting outwardly therefrom and converging toward each other, and having the outer ends integral with each other, substantially as and for the purpose described.

In testimony whereof I affix my signature.

HERMANN BRUNO DIPWORTH.

Copies of this patent may be obtained for five cents each, by addressing the "Commissioner of Patents, Washington, D. C."